United States Patent [19]

Yoon

[11] Patent Number: 6,038,688
[45] Date of Patent: Mar. 14, 2000

[54] NODE DISJOINT PATH FORMING METHOD FOR HYPERCUBE HAVING DAMAGED NODE

[75] Inventor: Ki Song Yoon, Daejeon, Rep. of Korea

[73] Assignee: Electronics and Telecommunications Research Intitute, Daejeon, Rep. of Korea

[21] Appl. No.: 09/007,815

[22] Filed: Jan. 15, 1998

[30] Foreign Application Priority Data

Dec. 2, 1997 [KR] Rep. of Korea .................. 97-65369

[51] Int. Cl.[7] ................................................. G06F 15/16
[52] U.S. Cl. ............................. 714/43; 712/10; 712/11; 712/12; 712/16; 712/20
[58] Field of Search ................................. 712/10, 11, 12, 712/16, 20; 714/43

[56] References Cited

U.S. PATENT DOCUMENTS

| | | |
|---|---|---|
| 5,313,645 | 5/1994 | Rolfe . |
| 5,669,008 | 9/1997 | Galles et al. .............................. 712/12 |
| 5,794,059 | 8/1998 | Barker et al. .............................. 712/10 |

OTHER PUBLICATIONS

"Identification of operational subcubes in unreliable hypercubes", S. Latifi, IEEE Proceedings, vol. 139, No. 2, Mar. 1992, pp. 117–122.

"Combinatorial Analysis of the Fault–Diameter of the n–cube", S. Latifi, IEEE Transactions on Computers, vol. 42, No. 1, Jan. 1993, pp. 27–33.

"Algorithms for Node Disjoint Paths in Incomplete Star Networks", Q. Gu and S. Peng, Parallel and Distributed Systems, 1994. International Conference on Dec. 19–21, 1994, pp:296 –303.

"Fault–Tolerant Routing with Regularity Restoration in Boolean n–Cube Interconnection Networks", M. Horng and L. Kleinrock, Parallel and Distributed Processing, Dec. 1991, pp: 458 –465.

"An Efficient Algorithm for k–Pairwise Node Disjoint Path Problem in Hypercubes", Q. Gu and S. Peng, Parallel and Distributed Processing, 1995, pp: 673 –680.

*Primary Examiner*—Ayaz R. Sheikh
*Assistant Examiner*—Rupal D. Dharia
*Attorney, Agent, or Firm*—Antonelli, Terry, Stout & Kraus, LLP

[57] ABSTRACT

A node disjoint path forming method for a hypercube having a damaged node which is capable of using unused nodes (surplus nodes) in an n-number of node disjoint paths each having a length of n with respect to n-dimensional hypercubes more than 4-cube, so that it is possible to obtain an n-number of node disjoint paths each having a length of n even though there are damaged nodes. The method includes the steps of a first step for forming a linear arrangement consisting of an n-number of integers (0, 1, 2, . . . n–1) with respect to an n-dimension and searching a linear arrangement which is not neighbored in a linear arrangement in which integers which indicate a value of 1 in an address of a damaged node are circulated, assuming that a node address with respect to an n-address is expressed as a position of 1 among an n-number of binary digits, separating each value by a comma by defining an address value of a decimal digit indicating a position of 1 using a bracket, defining the rightmost position as 0 and the leftmost position as n–1, and a second step for forming a linear arrangement using integers of an arrangement in which values indicating a position of 1 in an address of a damaged node are not neighbored on a circumferential portion, moving the linear arrangement by one digit in the right direction and forming an nxn first matrix.

1 Claim, 4 Drawing Sheets

FIG.3A
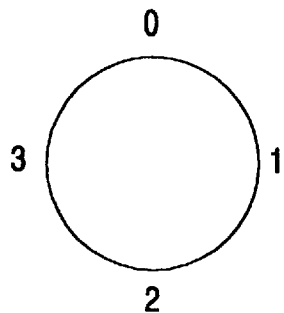
FIG.3B
$$\begin{bmatrix} 0 & 1 & 2 & 3 \\ 1 & 2 & 3 & 0 \\ 2 & 3 & 0 & 1 \\ 3 & 0 & 1 & 2 \end{bmatrix}$$
FIG.3C
$$\begin{bmatrix} (0) & (0,1) & (0,1,2) & (0,1,2,3) \\ (1) & (1,2) & (1,2,3) & (1,2,3,0) \\ (2) & (2,3) & (2,3,0) & (2,3,0,1) \\ (3) & (3,0) & (3,0,1) & (3,0,1,2) \end{bmatrix}$$
FIG.3D
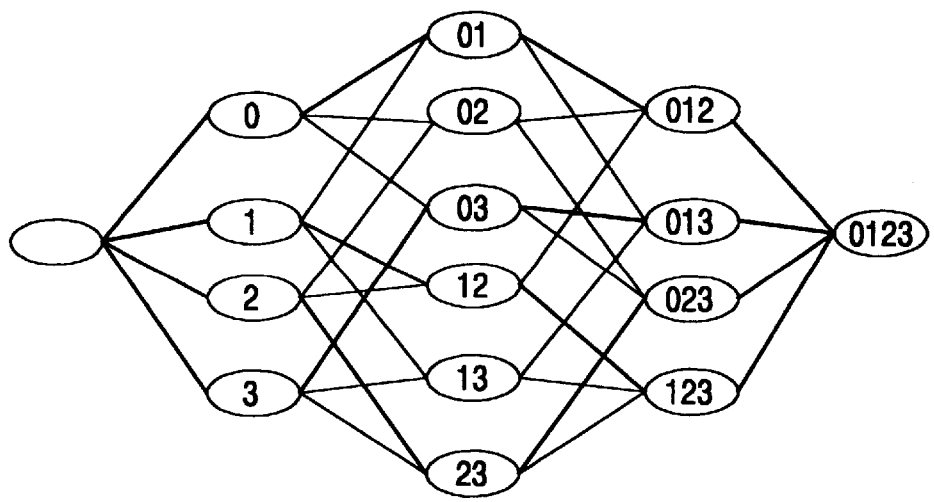

FIG. 4A
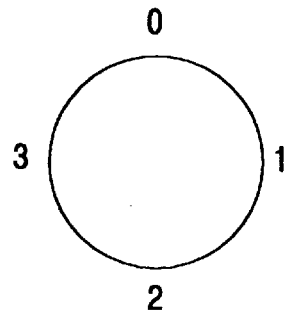
FIG. 4B
$$\begin{bmatrix} 0 & 2 & 1 & 3 \\ 2 & 1 & 3 & 0 \\ 1 & 3 & 0 & 2 \\ 3 & 0 & 2 & 1 \end{bmatrix}$$
FIG. 4C
$$\begin{bmatrix} (0) & (0,2) & (0,2,1) & (0,2,1,3) \\ (1) & (2,1) & (2,1,3) & (2,1,3,0) \\ (2) & (1,3) & (1,3,0) & (1,3,0,2) \\ (3) & (3,0) & (3,0,2) & (3,0,2,1) \end{bmatrix}$$
FIG. 4D
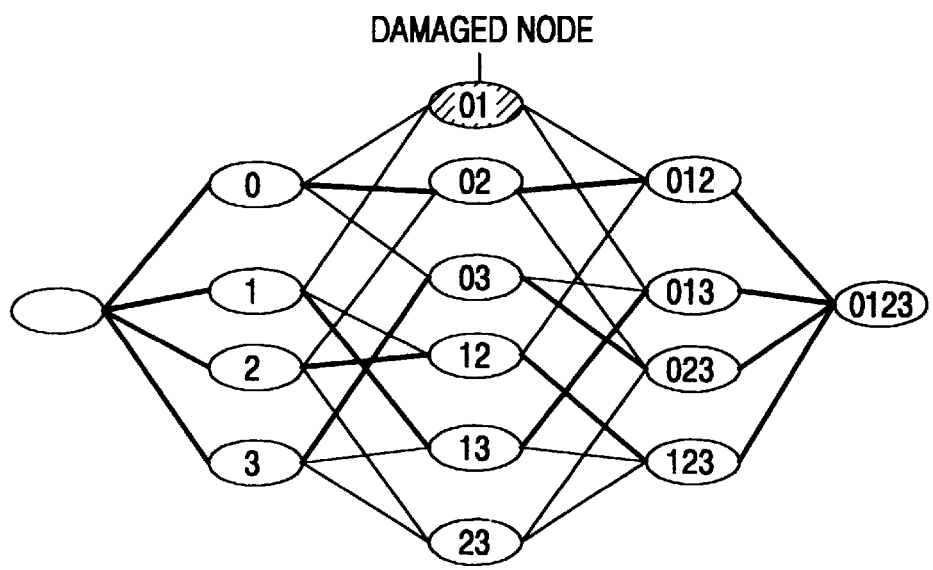

NODE DISJOINT PATH FORMING METHOD FOR HYPERCUBE HAVING DAMAGED NODE

BACKGROUND OF THE INVENTION

1. Field of the Invention

The present invention relates to a node disjoint path forming method for a hypercube having a damaged node, and particularly, to a node disjoint path forming method for a hypercube having a damaged node which is capable of overcoming a fault tolerance in a topology between processors of a parallel processing computer and searching an n-number of node disjoint paths each having an n-length by avoiding a damaged node, which is known, using a predetermined algorithm.

2. Description of the Conventional Art

Conventionally, an n-dimensional hypercube has a $2_n$ number of nodes. At this time, each node has an n-number of edges. As one of the important characteristics, the n-dimensional hypercube has an n-number of node disjoint paths having an n-number of lengths. There are known various node disjoint path forming methods. However, the above-described methods are not adapted with respect to the damaged nodes. In order to overcome the above-described problem, the conventional method is first adapted, and then the damaged nodes formed in the node disjoint path are substituted with surplus nodes. Thereafter, if there is a duplicate node the node disjoint characteristic of which is checked, the duplicate node should be substituted. The above-described operation is repeated. In this case, since there are numerous occasions for substituting one node and more than one node at one time, it is very hard to manually check the entire node disjoint characteristic.

A method is disclosed for forming a path by avoiding a damaged node in the hypercube. In more detail, this method is directed to substituting the damaged node based on the damaged condition of the node with respect to one path.

SUMMARY OF THE INVENTION

Accordingly, it is an object of the present invention to provide a node disjoint path forming method for a hypercube having a damaged node which overcomes the before mentioned problems encountered in the conventional art.

It is another object of the present invention to provide a node disjoint path forming method for a hypercube having a damaged node which is capable of maintaining a desired node disjoint characteristic when substituting a predetermined number of nodes wherein one damaged node affects another node or a node disjoint characteristic.

It is still another object of the present invention to provide a node disjoint path forming method for a hypercube having a damaged node which is directed to adapting a matrix with respect to a method for searching an n-number of node disjoint paths each having an n-length by avoiding a damaged node, which is known, by using one algorithm.

It is still another object of the present invention to provide a node disjoint path forming method for a hypercube having a damaged node which is capable of using unused nodes (surplus nodes) in an n-number of node disjoint paths each having a length of n with respect to n-dimensional hypercubes more than 4-cube, so that it is possible to obtain an n-number of node disjoint paths each having a length of n even though there are damaged nodes.

To achieve the above objects, there is provided an improved node disjoint path forming method for a hypercube having a damaged node which includes the steps of a first step for forming a linear arrangement consisting of an n-number of integers (0, 1, 2, . . . n−1) with respect to an n-dimension and searching a linear arrangement which is not neighbored in a linear arrangement in which integers which indicate a value of 1 in an address of a damaged node are circulated, assuming that a node address with respect to an n-address is expressed as a position of 1 among an n-number of binary digits, separating each value by a comma by defining an address value of a decimal digit indicating a position of 1 using a bracket, defining the rightmost position as 0 and the leftmost position as n−1, and a second step for forming a linear arrangement using integers of an arrangement in which values indicating a position of 1 in an address of a damaged node are not neighbored on a circumferential portion, moving the linear arrangement by one digit in the right direction and forming an n×n first matrix, as follows:

$$\begin{matrix} 0 & 1 & \ldots & (n-1) \\ 1 & 2 & & 0 \\ \cdot & & \cdot & \cdot \\ (n-1) & 0 & \ldots & (n-2) \end{matrix}$$

where, n denotes positive integers wherein the integer indicating the damaged node address is not neighbored each other in an arrangement of "0, 1, . . . (n−1)" of a first row and column:

wherein an n X n second matrix indicating a node address with respect to an n-dimension by forming a linear arrangement with respect to a first matrix, as follows:

$$\begin{matrix} 0 & (0,1) & \ldots & (0, 1, \ldots, (n-1)) \\ \cdot & \cdot & \ldots & \\ (n-1) & ((n-1), 0) & \ldots & ((n-1), 0, \ldots, (n-2)), \end{matrix}$$

whereby a step for generating a node of an address which is expressed in a linear arrangement of each row as a node disjoint path is performed.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A through 3D are views illustrating a node disjoint path forming method for a 4-hypercube according to the present invention; and FIGS. 4A through 4D are views illustrating a damaged node and a node disjoint path forming method avoiding the damaged node in a 4-hypercube according to the present invention.

DETAILED DESCRIPTION OF THE INVENTION

The method for forming the n-number of node disjoint paths each having a length of n in an n-dimensional hypercube having damaged nodes according to the present invention will now be explained with reference to the accompanying drawings.

First, the n-dimensional hypercube has a $2^n$ number of nodes wherein each node has an n-number of edges.

Figure 1:
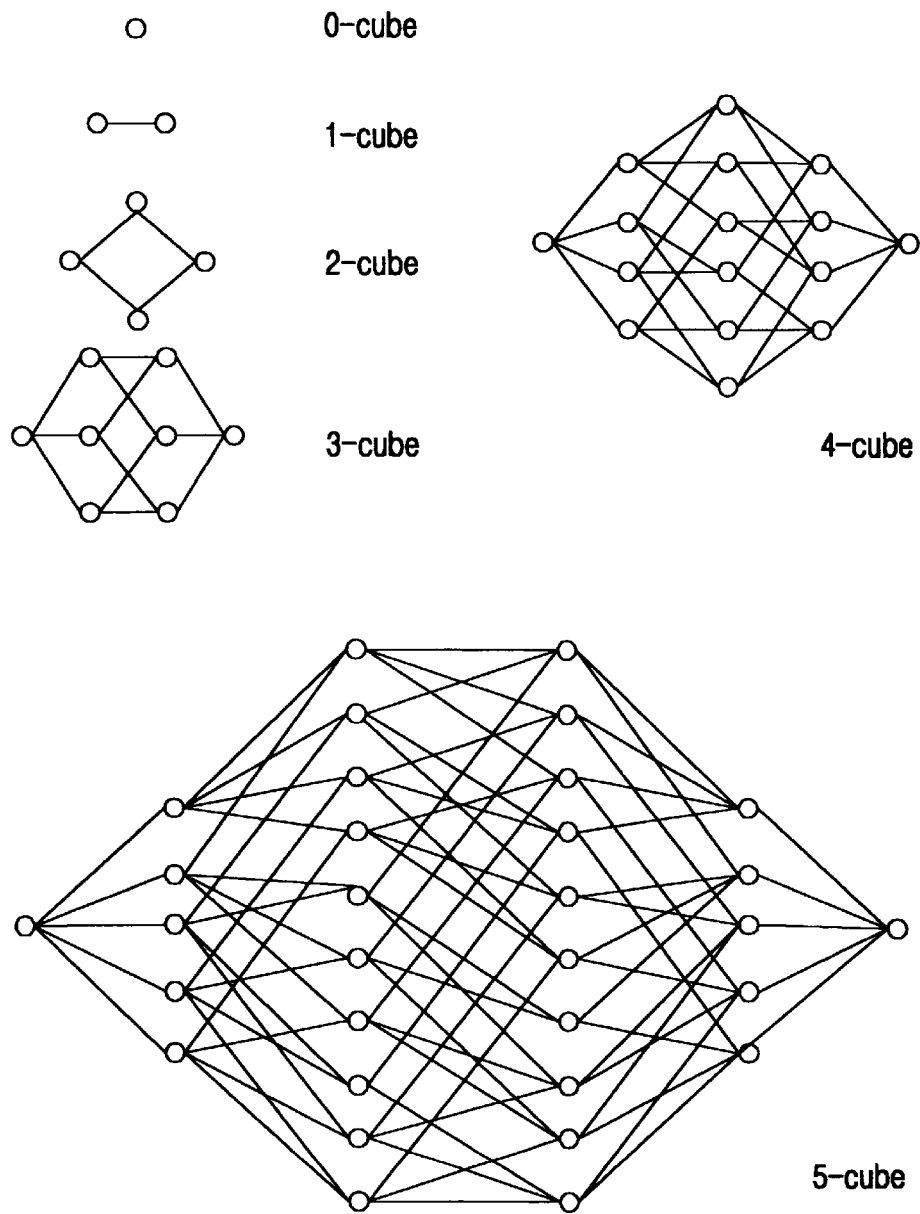
FIG. 1 is a view illustrating the structures of 1-cube, 2-cube, 3-cube, 4-cube and 5-cube according to the present invention.

FIG. 1 illustrates the structures of 1-cube, 2-cube, 3-cube, 4-cube and 5-cube according to the present invention. In the present invention, an n-dimensional cube is called as an n-cube for easier understanding. In addition, each node is formed of binary digits, namely, 0 and 1, which are called a node address. Therefore, each node of the n-cube has an n-number of binary digits. In addition, the address of neighboring nodes has only one different digit.

In the present invention, the following node address expression method is used. Among the n-number of binary digits, the position in which the value is 1 indicates its address, and the entire value is indicated in a bracket, and each values are separated by comma. At this time, the rightmost position is 0, and the leftmost position is n–1. For example, a 0101 node of the 4-cube is (0,2), and a 0000 node is ( ), and a 1111 node is (0,1,2,3).

Figure 2A:
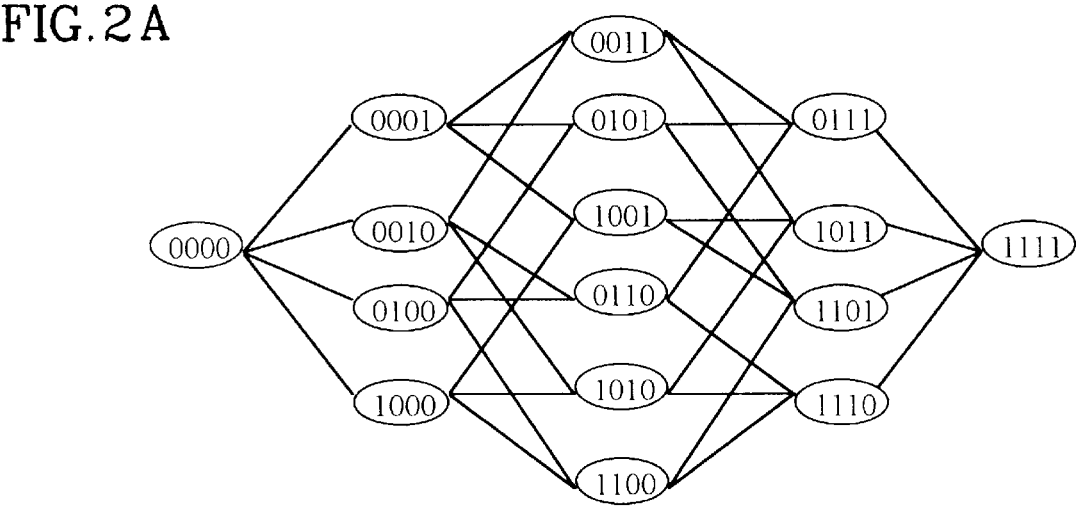
FIGS. 2A and 2B are views illustrating a node address of a 4-hypercube and a method of indicating the same according to the present invention.
Figure 2B:
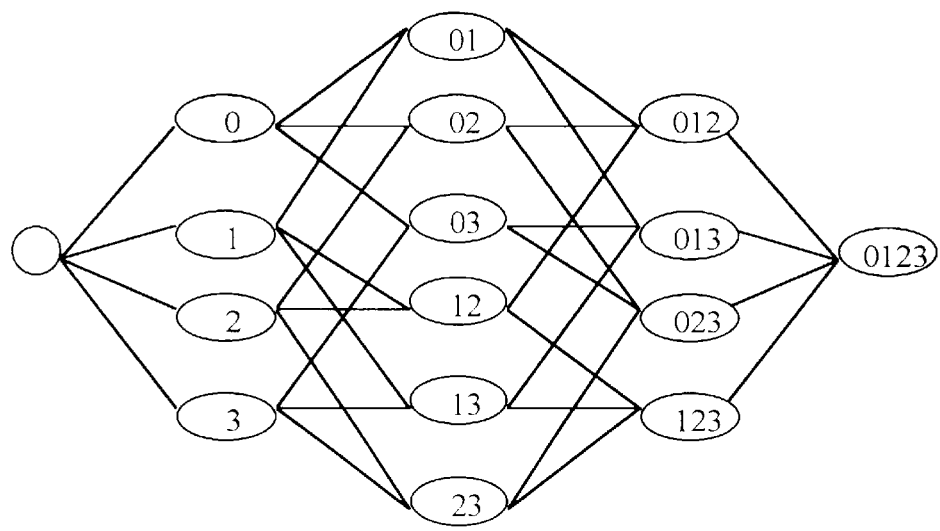

Furthermore, as shown in FIG. 2, for example, the leftmost node (0000) is expressed as ( ), and the node (0001) is expressed as (0) since there is 1 in the first position of the right side, and the node (0010) is expressed as (1) since there is 1 in the second bit of the right side, and the node (0011) is expressed as (01) since there is 1 in the first and second bits of the right side, respectively, and the node (0101) is expressed as (02) since there is 1 in the first and third positions in the right side. Namely, the node (023) denotes the node (1101) because 0 is expressed since 1 is positioned in the first position of the right side, 2 is expressed since 1 is positioned in the third position of the right side, and 3 is expressed since 1 is positioned in the fourth position of the right side.

FIG. 3 illustrates four node disjoint paths having a length of 4 in the hypercube using a 4×4 matrix. As shown therein, four integers from 0 to 3 are linearly arranged (in FIG. 3, 0, 1, 2, 3 are arranged) thus forming a 4×4 matrix and are expressed like (0), (0,1), (0,1,2), and (0,1,2,3) in which a start digit of each row of the matrix is circulated. Namely, the thusly formed matrix indicates a node disjoint path.

FIGS. 4A through 4D illustrate node disjoint paths by avoiding the damaged node when a damaged node (0,1) is found in four node disjoint paths each having a length of 4 of the four-dimensional hypercube using a linear arrangement of 0 1 2 3.

First, when the damaged node (0,1) is generated, the linear arrangement in which the damaged node (0,1) is not neighbored is searched from the linear arrangement of 0 1 2 3. As shown in FIG. 4A, the linear arrangement 0 1 2 3 are arranged on a circumferential portion, and then the arrangement in which 0 and 1 are not neighbored is searched.

As shown in FIG. 4A, in the arrangement of 0 2 1 3, 0 and 1 are not neighbored, a first matrix is formed using the arrangement 0 2 1 3 as shown in FIG. 4B, and a second matrix is formed using the circulation configuration in which the first matrix is increased by 1, so that it is possible to search the node disjoint path which avoids the damaged node (0,1).

Next, the method of generating an n-number of node disjoint paths having an n-number of lengths in the n-dimensional hypercube using a new node address will now be explained. As shown in the following example of a 6-cube, a predetermined linear arrangement is made using six integers from 0 to 5. Thereafter, the linear arrangement is moved by one digit in the right direction, thus forming a 6×6 matrix.

```
0 1 2 3 4 5
1 2 3 4 5 0
2 3 4 5 0 1
3 4 5 0 1 2
4 5 0 1 2 3
5 0 1 2 3 4
```

The following 6×6 matrix is formed in each row of the 6×6 matrix.

```
(0)  (0, 1)  (0, 1, 2)  (0, 1, 2, 3)  (0, 1, 2, 3, 4)  (0, 1, 2, 3, 4, 5)
(1)  (1, 2)  (1, 2, 3)  (1, 2, 3, 4)  (1, 2, 3, 4, 5)  (1, 2, 3, 4, 5, 0)
(2)  (2, 3)  (2, 3, 4)  (2, 3, 4, 5)  (2, 3, 4, 5, 0)  (2, 3, 4, 5, 0, 1)
(3)  (3, 4)  (3, 4, 5)  (3, 4, 5, 0)  (3, 4, 5, 0, 1)  (3, 4, 5, 0, 1, 2)
(4)  (4, 5)  (4, 5, 0)  (4, 5, 0, 1)  (4, 5, 0, 1, 2)  (4, 5, 0, 1, 2, 3)
(5)  (5, 0)  (5, 0, 1)  (5, 0, 1, 2)  (5, 0, 1, 2, 3)  (5, 0, 1, 2, 3, 4)
```

As shown in the above linear arrangement, six node disjoint paths each having a length of 6 between the leftside first node ( ) and the rightside final node (0,1,2,3,4,5) in the 6-cube.

The node disjoint path generating method according to the present invention using the above-described technique has the following characteristic. If integers which are randomly selected are arranged on the circumferential portion, only the nodes each consisting of neighboring integers are used in the node disjoint path.

```
     0
  5     1
  4     2
     3
```

The nodes to be used: (0), (0,1), (0,1,2), (1,2,3,4) (3,4,5), (1,2,3,4,5), . . .

The nodes not to be used: (0,2), (1,4), (3,5), (0,2,3), (0,3,5), (0,1,2,4), (0,1,3,4), . . .

Namely, among the integers arranged on the circumferential portion, the nodes which are defined by consistent integers become usable nodes, and the nodes which are defined by the integers which are not consistent are not used.

Therefore, it is possible to check whether there is a linear arrangement using the above-described characteristics, in which the integers of the damaged node addresses are not neighbored, so that it is possible to judge whether a node disjoint path is formed.

If the nodes of (2,0), (5,3), (2,4,5), (2,0,5), (0,1,3), (2,4, 5,1), (2,4,0,1) in the six-dimensional hypercube are damaged, it is possible to avoid a neighboring characteristic with respect to all the damaged nodes based on the linear arrangement of 3 2 4 0 5 1. Therefore, there exist six node disjoint paths each having a length of 6 between the node ( ) and the node (0,1,2,3,4,5).

```
        0
    4       5
    2       1
        3
```

In the present invention, the node disjoint path generating method in the hypercube having a damaged node is adapted to all the hypercube higher than 4-cube.

As described above, in the present invention, it should be possible to check a substitution of a surplus node and a node disjoint characteristic in order to search an n-number of node disjoint paths each having a length of n in an n-dimensional hypercube having a damaged node. In addition, in the present invention, there is provided a method for concurrently substituting one or more than two nodes and checking a node disjoint characteristic, so that a fault tolerance application range of a hypercube is increased.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for searching a node disjoint path by avoiding a damaged node existing in an n-dimensional hyper cube, comprising:

a first step for forming a linear arrangement consisting of an n-number of integers $(0, 1, 2, \ldots n-1)$ with respect to an n-dimension and searching a linear arrangement which is not neighbored in a linear arrangement in which integers which indicate a value of 1 in an address of a damaged node are circulated, assuming that a node address with respect to an n-address is expressed as a position of 1 among an n-number of binary digits, separating each value by a comma by defining an address value of a decimal digit indicating a position of 1 using a bracket, defining the rightmost position as 0 and the leftmost position as $n-1$; and a second step for forming a linear arrangement using integers of an arrangement in which values indicating a position of 1 in an address of a damaged node are not neighbored on a circumferential portion, moving the linear arrangement by one digit in the right direction and forming an n×n first matrix, as follows:

$$\begin{array}{cccc} 0 & 1 & \ldots & (n-1) \\ 1 & 2 & & 0 \\ \vdots & \vdots & \ddots & \vdots \\ (n-1) & 0 & \ldots & (n-2) \end{array}$$

where, n denotes positive integers wherein the integer indicating the damaged node address is not neighbored each other in an arrangement of "$0,1, \ldots , (n-1)$" of a first row and column:

wherein an n×n second matrix indicating a node address with respect to an n-dimension by forming a linear arrangement with respect to a first matrix, as follows:

$$\begin{array}{cccc} 0 & (0,1) & \ldots & (0, 1, \ldots, (n-1)) \\ \vdots & \vdots & \ldots & \\ (n-1) & ((n-1), 0) & \ldots & ((n-1), 0, \ldots, (n-2)), \end{array}$$

whereby a step for generating a node of an address which is expressed in a linear arrangement of each row as a node disjoint path is performed.

* * * * *